(12) United States Patent
Maeno et al.

(10) Patent No.: US 6,429,167 B1
(45) Date of Patent: Aug. 6, 2002

(54) ALUMINA-SUPPORTED RUTHENIUM CATALYST

(75) Inventors: Hironobu Maeno, Sodegaura; Hiroto Matsumoto, Tokyo, both of (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 0 days.

(21) Appl. No.: 09/554,096

(22) PCT Filed: Nov. 27, 1997

(86) PCT No.: PCT/JP97/04340

§ 371 (c)(1),
(2), (4) Date: May 25, 2000

(87) PCT Pub. No.: WO99/28027

PCT Pub. Date: Jun. 10, 1999

(51) Int. Cl.$^7$ .................................... B01J 23/00
(52) U.S. Cl. .................. 502/325; 502/326; 502/327; 502/328; 502/331; 502/332
(58) Field of Search ................ 502/325, 326, 502/328, 331, 332, 415, 439

(56) References Cited

U.S. PATENT DOCUMENTS

| | | | | |
|---|---|---|---|---|
| 3,897,367 A | * | 7/1975 | Lauder | 252/462 |
| 3,972,837 A | * | 8/1976 | Acres et al. | 252/473 |
| 4,134,860 A | * | 1/1979 | Hindin et al. | 252/466 PT |
| 4,171,287 A | * | 10/1979 | Keith | 252/462 |
| 4,189,404 A | * | 2/1980 | Keith et al. | 252/462 |
| 4,189,405 A | * | 2/1980 | Knapton et al. | 252/462 |
| 4,390,456 A | * | 6/1983 | Sanchez et al. | 252/448 |
| 4,424,162 A | * | 1/1984 | Rosen | 260/409 |
| 4,519,951 A | * | 5/1985 | Qualeatti et al. | 260/409 |
| 4,524,225 A | * | 6/1985 | Qualeatti et al. | 568/885 |
| 4,528,279 A | * | 7/1985 | Suzuki et al. | 502/200 |
| 4,757,045 A | * | 7/1988 | Turner et al. | 502/252 |
| 5,232,885 A | * | 8/1993 | Clark et al. | 502/25 |
| 5,399,259 A | * | 3/1995 | Dai et al. | 208/216 |
| 5,399,324 A | * | 3/1995 | Subramanian et al. | 423/213.7 |
| 5,416,054 A | * | 5/1995 | Dai et al. | 502/211 |
| 5,711,146 A | * | 1/1998 | Armstrong et al. | 60/218 |
| 5,814,112 A | * | 9/1998 | Elliott et al. | 48/197 R |
| 5,935,896 A | * | 8/1999 | Dupuis et al. | 502/439 |
| 5,965,481 A | * | 10/1999 | Durand et al. | 502/304 |
| 5,985,790 A | * | 11/1999 | Moskovitz et al. | 502/415 |

FOREIGN PATENT DOCUMENTS

| | | |
|---|---|---|
| JP | 49-5861 | 1/1974 |
| JP | 9-29097 | 2/1997 |
| JP | 10-52639 | 2/1998 |

OTHER PUBLICATIONS

Patent Abstracts of Japan, JP 7–088376, Apr. 4, 1995.
Patent Abstracts of Japan, JP 5–261286, Oct. 12, 1993.
Patent Abstracts of Japan, JP 7–251070, Oct. 3, 1995.
Patent Abstracts of Japan, JP 8–048502, Feb. 20, 1996.

\* cited by examiner

*Primary Examiner*—Steven P. Griffin
*Assistant Examiner*—Cam N. Nguyen
(74) *Attorney, Agent, or Firm*—Oblon, Spivak, McClelland, Maier & Neustadt, P.C.

(57) ABSTRACT

A ruthenium-on-alumina catalyst including at least a ruthenium component carried by a porous α-alumina material. The catalyst has a specific surface area ($S_1$) of 7–50 m$^2$/g, and a ratio $S_1/S_2$ of the specific surface area of the ruthenium-on-alumina catalyst ($S_1$) to the surface area of the porous α-alumina material ($S_2$) of 3–50. The catalyst has a micropore structure having a pore diameter distribution profile in which at least one peak falls within the range of 5–1,000 angstroms. The catalyst of the invention has excellent crushing strength, and high activity per unit ruthenium weight. Moreover, the catalyst has remarkable heat resistance, maintaining its high activity even at high temperatures of reaction and firing.

9 Claims, No Drawings

ALUMINA-SUPPORTED RUTHENIUM CATALYST

BACKGROUND OF THE INVENTION

1. Field of the Invention

The present invention relates to ruthenium-on-alumina catalysts. More particularly, the invention relates to ruthenium-on-alumina catalysts—in which ruthenium or similar components are carried by an α-alumina porous material—which are advantageously used in a variety of a hydrogen production processes, inter alia, in processes making use of a steam reforming process applied to light hydrocarbons and oxygen-containing compounds for producing synthetic gas, reduction gas suitable for use in direct-reduction iron making, city gas, and hydrogen gas. The ruthenium-on-alumina catalysts of the present invention are also advantageously used in a reformer (for producing hydrogen) contained in a fuel cell.

2. Background Art

In conventional steam reforming or like processes for light hydrocarbons by use of a catalyst, there have generally been used catalysts formed of a transition metal such as nickel carried by a catalyst carrier such as γ-alumina.

In current steam reforming processes, in order to economize construction costs and operation costs, heat flux tends to be raised, whereas steam/carbon ratio (S/C) tends to be decreased. Under such operation conditions, carbon easily precipitates on the catalyst, to cause an increased pressure difference in piping. As a result, the catalyst tube sometimes clogs to make continuing the reaction difficult. Thus, there is strong demand for a catalyst with which the amount of carbon generating on the catalyst is greatly suppressed as compared with that attained by conventional catalysts, while exhibiting high catalytic activities.

Ruthenium-on-alumina catalysts containing ruthenium as a catalytic component have become of interest as catalysts which permit suppressed carbon precipitation thereon and which have enhanced activities. Since ruthenium-on-alumina catalysts exhibit excellent catalytic performance as proven by their high activities and ability to suppress precipitation of carbon even under conditions of a low steam/carbon ratio during operation, Japanese Patent Application Laid-Open (kokai) No. 5-220397, among others, discloses ruthenium-on-alumina catalysts in which zirconium oxide derived from a precursor zirconia sol and a ruthenium component are carried by aluminum oxide containing alkaline earth metal aluminate.

However, the ruthenium-on-alumina catalysts disclosed in the above reference has the problem that their activities are insufficient under reforming conditions of a low steam/carbon (S/C) ratio of 2 or less and at a high temperature of not less than 680° C. Also, since ruthenium is a noble metal of high price, making ruthenium-containing catalysts industrially useful requires, in addition to securing satisfactory catalytic performance, the suppression of ruthenium content so as to reduce catalyst costs. Moreover, in view that steam reforming reactions are performed at high temperature, there is sought development of catalysts that not only have high activities, but are also resistant to heat.

From the point of prevention of environmental destruction caused by air pollution, hydrogen fuels have become of interest as alternate energy sources in place of gasoline, etc. The hydrogen fuels are converted into electric energy by, for example, a fuel cell. Hydrogen which serves as the starting material is generally produced from hydrocarbons or oxygen-containing compounds through a steam reforming process. In particular, in place of hydrocarbons such as city gas and LPG which have conventionally been used in fuel cells, oxygen-containing compounds such as methanol and dimethyl ether have recently come to be expected to serve as fuel for transportation power sources (electric cars). As a catalyst for reforming oxygen-containing compounds, there has been used ruthenium, nickel, or a similar metal carried by (or impregnated in) a catalyst carrier such as alumina.

A typical fuel cell generally contains a reactor for reformation. In recent years, reformation reactors in the form of a plurality of concentric hollow cylinders have acquired popularity, in which catalyst layers are arranged to form cylindrical shells so as to make the entirety of the fuel cell compact and to improve its performance (Japanese Patent Application Laid-Open (kokai) Nos. 3-122001 and 60-264303).

In reformation reactors of the above type, a burner is placed at the center of the innermost shell and a plurality of catalyst layers are disposed so as to surround the burner, to thereby maximize the area of heat transfer surface and reduce the size of the reactor. Therefore, at the time of starting up and stopping the operation of the reactor, the temperature of the inside of a catalyst layer differ greatly from that of the outside of the catalyst layer. The temperature difference induces strain in the circumferencial direction of each shell due to difference in thermal expansion, applying on catalyst layers a compression force which may crush the catalyst under pressure. When the catalyst is crushed, powder generates and clogs catalyst layers and downstream piping, and as a result, operation may be discontinued due to elevated flow resistance.

As a measure for preventing destruction of catalyst under pressure, "Fuel Association Journal," Vol. 68, No. 3 (1989) discloses from pages 236 to 243 a ruthenium-on-alumina catalyst in which ruthenium serves as a catalyst and α-alumina serves as a catalyst carrier.

However, since the ruthenium-on-alumina catalyst disclosed in this journal uses α-alumina prepared by firing γ-alumina at 1300° C., the molded α-alumina has an insufficient crushing strength for use in multi-shell-type reformation reactors, as they require high crushing strength. Moreover, since ruthenium is carried by α-alumina obtained by firing γ-alumina, the resultant catalyst has a specific surface area of as small as 6.6 m$^2$/g, and therefore, even when ruthenium of high activity is used as an active component, ruthenium cannot be sufficiently dispersed on and within the carrier, and as a result, only insufficient catalyst activity can be obtained. Furthermore, when α-alumina is prepared through firing at a sufficiently high temperature so as to increase the crushing strength, the resultant α-alumina of a closest packing structure is generally not suitable as a catalyst carrier, because it does not have micropores of a submicron or smaller size, and in addition, has only a small specific surface area even when it is molded into a catalyst carrier. In other words, when a catalyst carrier constructed of α-alumina is impregnated with an active component, the specific surface area necessary for satisfactorily dispersing active components on and within the carrier is insufficient, and thus, even though the amount of the catalyst component is increased, sufficient activity cannot be obtained.

Also, as described above, Japanese Patent Application Laid-Open (Kokai) No. 5-220397 discloses a ruthenium-on-alumina catalyst in which zirconium oxide derived from a precursor zirconia sol and a ruthenium component are carried by aluminum oxide containing alkaline earth metal aluminate.

However, in consideration that the zirconia sol used in that publication is present in the form of particles of 100 angstroms or more, the zirconium oxide derived therefrom is considered to grow into large particles. Moreover, since the alkaline earth metal aluminate is present as crystals, particles thereof are also considered to grow into large particles. Thus, the catalyst is predicted to have disadvantages of reduced specific surface area and insufficient catalytic activities.

SUMMARY OF THE INVENTION

The present invention was accomplished in view of the aforementioned problems, and the object of the invention is to provide a ruthenium-on-alumina catalyst—in which a porous alumina material which is useful as a catalyst carrier due to its excellent heat resistance and crushing strength is impregnated with an active component, ruthenium—which has a number of notable features: remarkably excellent activity, particularly reformation activity, per unit weight of ruthenium; excellent resistance to heat which assures high activity in reactions at high temperatures: and a prolonged service life.

The above object is achieved by a ruthenium-on-alumina catalyst comprising at least a ruthenium component carried by a porous α-alumina material, which catalyst has a specific surface area ($S_1$) of 8–50 m$^2$/g.

In a preferred mode of the invention, the ratio $S_1/S_2$ of the specific surface area of the aforementioned ruthenium-on-alumina catalyst ($S_1$) to the surface area of the porous α-alumina material ($S_2$) is 3–50.

In another preferred mode of the invention, the ruthenium-on-alumina catalyst has a micropore profile with at least one peak falling within the range of 5–1,000 angstroms.

In still another preferred mode of the invention, the porous α-alumina material is impregnated with at least a ruthenium component and a zirconium component, and the respective amounts (contents) are such that the former accounts for 0.05–5% by weight as reduced to elemental ruthenium and the latter accounts for 0.05–20% by weight as reduced to zirconium oxide, both with respect to the weight of the porous α-alumina material.

In still another preferred mode of the invention, the porous α-alumina material is impregnated with at least a ruthenium component, a zirconium component, and an alkaline earth metal or rare earth metal component, and the respective amounts are such that the ruthenium component accounts for 0.05–5% by weight as reduced to elemental ruthenium, the zirconium component accounts for 0.05–20% by weight as reduced to zirconium oxide, and the alkaline earth metal or rare earth metal component accounts for 0.5–20% by weight as reduced to its corresponding oxide, wherein all percentages are with respect to the weight of the porous α-alumina material.

In yet another preferred mode of the invention, the porous α-alumina material is impregnated with at least a ruthenium component, a zirconium component, an alkaline earth metal or rare earth metal component, and a cobalt component, and the respective amounts are such that the ruthenium component accounts for 0.05–5% by weight as reduced to elemental ruthenium, the zirconium component accounts for 0.05–20% by weight as reduced to zirconium oxide, the alkaline earth metal or rare earth metal component accounts for 0.5–20% by weight as reduced to its corresponding oxide, wherein all percentages are with respect to the weight of the porous α-alumina material, and the cobalt component is incorporated at a molar ratio of cobalt (Co) to (Ru), Co/Ru, of 0.01–30.

Furthermore, there is provided a catalyst for steam reformation reactions applied to hydrocarbons, making use of the above-described ruthenium-on-alumina catalyst.

BEST MODE FOR CARRYING OUT THE INVENTION

Various embodiments of the ruthenium-on-alumina catalyst of the present invention will next be described.

I. Porous α-alumina Material

In the present invention, porous α-alumina material is used as an alumina carrier. The porous α-alumina material which may be used in the present invention is selected from among conventional ones whose compositions and properties have been regulated or controlled through incorporation of additives, pretreatment, or selection of a suitable preparation method. For example, the porous α-alumina material may be subjected to chemical treatment such as acid treatment, alkali treatment, or ion-exchange treatment to thereby regulate its acidity; heating or firing so as to adjust the water content or the OH content in the surface of the alumina material; or a variety of means to thereby control the size and distribution of micropores and the related surface area.

The shape and size of the porous α-alumina material of the present invention is not particularly limited. α-Alumina powder which serves as a starting material may be granulated, compressed, injection-molded, or subjected to other suitable processes to form powders, granules, beads, small columns, pellets, or Raschig rings, all of which are suitably used in the present invention. Alternatively, a carrier substrate which has a specific structure such as a monolithic shape and is obtained from materials inert to chemical reaction may be spray-coated with a raw α-alumina powder to thereby form a catalyst carrier of the present invention.

Of these, preferred catalyst carriers are porous α-alumina materials granulated or molded into spheres, beads, pellets, or Raschig rings, and coated materials formed by coating a specific structure such as a monolithic structure with α-alumina, from the viewpoint of securing a sufficient specific surface area of the catalyst, reduction of pressure loss in a catalyst layer during reaction, and improving thermal conductivity to the reaction fluid. Of these types of materials, spheres, beads, Raschig rings, and coated monolithic carrier substrates are particularly preferred in consideration of high compressive strength.

Physical properties and manufacturing methods of the porous α-alumina material used in the present invention will next be described.

1. Physical Properties of Porous α-alumina Material

The porous α-alumina material used in the present invention preferably has the following physical properties.

(1) Micropore Volume

A preferable micropore volume of the porous α-alumina material is typically 0.05–0.5 cc/g, more preferably 0.1–0.4 cc/g, and most preferably 0.1–0.3 cc/g. If the volume is less than 0.05 cc/g, α-alumina absorbs too small an amount of liquid; i.e., it cannot sufficiently absorb a below-mentioned impregnation solution containing an active catalyst component. As a result, catalyst components may be incorporated into a carrier only in insufficient amounts. On the other hand, micropore volumes of more than 0.5 cc/g—which indicate incomplete sintering of α-alumina—may result in insufficient crushing strength.

(2) Average Micropore Size

A preferable micropore size of the porous α-alumina material is typically 0.01–100 μm, preferably 0.05–50 μm, more preferably 0.1–10 µm. When the size is in excess of 100 µm, the carrier cannot retain an impregnation solution during the below-described step for impregnating the carrier with an active catalyst component, and therefore, not only repeated impregnation operations are required but also poor operation efficiency results. On the other hand, when the size is less than 0.01 µm, a starting material hydrocarbon cannot easily diffuse into micropores in the catalyst during reaction. In this case, there may not be obtained catalytic activity commensurate with the amount of the active catalyst component carried by the porous α-alumina material.

(3) Specific Surface Area

In order to increase the specific surface area of a catalyst formed by incorporating an active component into a porous α-alumina material, the porous α-alumina material per se preferably has a larger surface area. However, generally speaking, mechanical strength tends to decrease with increasing specific surface area of α-alumina. In the present invention, the surface area of the α-alumina carrier per se is typically 0.05 m$^2$/g or more, preferably 0.1–3 m$^2$/g, and more preferably 0.2–1 m$^2$/g.

(4) Crushing Strength

The crushing strength of the porous α-alumina material is typically 20 kgf or more, preferably 20–100 kgf, and more preferably 40–100 kgf, as measured by a Kiya's crushing strength measuring apparatus. When a carrier having a strength of 20 kgf or less is used, the catalyst may crushing during use in reactions, especially during the reactor is heated or cooled, whereas even when the strength is in excess of 100 kgf, technical advantages commensurate with the strength cannot be obtained.

(5) Crystallinity

The crystallinity of the porous α-alumina material is generally 70% or more, preferably 90% or more, more preferably 95% or more. When the crystallinity of a porous α-alumina material is less than 70%, the porous material per se or a catalyst product obtained therefrom exhibits low crushing strength, permitting generation of finely-divided powder in the reactor during use in reaction. When the porous α-alumina material is subjected to X-ray diffraction analysis, the ratio $I_B/I_A$ of the "most intensive peak strength attributed to compounds other than α-alumina" ($I_B$) to the "most intensive peak strength attributed to α-alumina" ($I_A$) is preferably 0.1 or less, more preferably 0.01 or less, wherein the compounds other than α-alumina include γ-alumina, η-alumina, and β-alumina. When the peak intensity ratio ($I_B/I_A$) is greater than 0.1, catalytic activity of a catalyst prepared from the porous α-alumina material tends to be low.

2. Method for Manufacturing Porous α-alumina Material (1) Starting Powder Material The porous α-alumina material which is used in the present invention is manufactured through granulating or shaping, and subsequently sintering, a starting material, α-alumina powder.

The grain size of the starting powder material is preferably 0.01–100 µm, more preferably 0.05–50 µm, and most preferably 0.1–10 µm.

When the grain size is less than 0.01 µm, the micropore size or micropore volume which is required for a catalyst may not always be obtained, whereas when the grain size is in excess of 100 µm, grains cannot be easily sintered and therefore a porous material having a sufficient mechanical strength cannot be obtained.

(2) Additives

A variety of additives are usually mixed with α-alumina powder so as to accelerate the sintering reaction or to form pores. Examples of the additives include inorganic additives such as clay minerals and water glass; and organic additives such as different types of starch grains (corn, wheat, adder's tongue lily, and potato), polyethylene glycol, PVA (polyvinyl alcohol), MC (methylcellulose), CMC (carboxymethylcellulose), glycerin, sorbitol, urea, acrylic emulsions, and waxes. Examples of the clay minerals include kaolin, bentonite, and gairome clay.

When the additive is an inorganic material, the grain size of the additive is preferably 0.01–100 µm, more preferably 0.05–50 µm, and most preferably 0.1–10 µm.

The additives are preferably incorporated in an amount of less than 50 parts by weight, more preferably in amounts of less than 20 parts by weight, based on 100 parts by weight of α-alumina.

(3) Molding Method

The porous α-alumina material of the present invention can generally be obtained through different molding methods by use of raw powder materials containing a variety of additives. There is no limitation on the molding method, and examples of the method include press molding, rolling-granulation, wet injection molding, CIP molding, pelletizing, and powder injection molding. Alternatively, porous α-alumina material of the present invention may be obtained through spray-coating a separately manufactured monolithic structure.

The molded product is classified as needed and is fired in, for example, a gas furnace of 1,100–1,600° C. in order to provide the end product, porous α-alumina material of the present invention.

II. Metal Components (Components Carried by the α-alumina Carrier)

In the present invention, a ruthenium component—which has proven to exhibit high activity at least in reformation reactions—is incorporated into the above-described α-alumina carrier. Multi-component system catalysts which also contain other components described below are industrially preferred in view of enhanced catalytic activity and an ensured long service life. Incorporation of such "other components" also reduces the amount of ruthenium—which is expensive as it is a noble metal—to thereby reduce the unit cost for manufacturing the catalyst.

(1) Two-component System (Ruthenium and Zirconium)

In a preferred mode of the present invention, there is provided a catalyst containing a ruthenium component and a zirconium component as the two main metal components.

When these two metal components are incorporated into an alumina carrier, zirconium oxide is present in the form of very fine particles, and therefore, the resultant catalyst comes to have a significantly extended surface area. As a result, the catalyst exhibits high activity and excellent heat resistance.

The amount of respective metal components may be suitably selected in accordance with relevant factors and conditions including properties of the carrier (such as the type, surface area, etc.) or use of the catalyst (i.e., the type and property of the reaction of interest). For example, the amount of the ruthenium component used in the present invention is typically 0.05–5% by weight, preferably 0.05–2% by weight, more preferably 0.1–2% by weight (calculated in terms of metallic ruthenium) with respect to the weight of the carrier. The amount of the zirconium component is typically 0.05–20% by weight, preferably 0.1–15% by weight, and more preferably 1.0–15% by weight (calculated in terms of zirconium oxide) with respect to the weight of the carrier.

(2) Three-component System (Ruthenium, Zirconium, and Alkaline Earth Metal or Rare Earth Metal)

In the present invention, in addition to the ruthenium component and zirconium component, one or more components selected from alkaline earth metal components and rare earth metal components may be incorporated into the carrier. Examples of the alkaline earth metal components and rare earth metal components include beryllium (Be), magnesium (Mg), calcium (Ca), strontium (Sr), barium (Ba), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Of these, magnesium is preferred in view of its notable effect of enhancing the heat resistance of the zirconium component. The total amount of these components is typically 0.5–20% by weight, preferably 0.5–15% by weight, more preferably 1–10% by weight, calculated in terms of the corresponding oxides of the alkaline earth metal component or rare earth metal component.

A description will next be given of catalysts incorporating a magnesium component, which is taken as a representative example among alkaline earth metal components and rare earth metal components.

In this case, ruthenium, zirconium, and magnesium are incorporated as the three primary components.

In a catalyst in which these three metal components are incorporated into an alumina carrier, zirconium and magnesium are present in the form of very fine grains of zirconium oxide and magnesium oxide, respectively. These two substances interact to suppress formation of crystals and grain growth. As a result, the catalyst comes to have a remarkably increased surface area, thereby providing high catalytic activity and excellent heat resistance.

The amount of the metal components used in the present invention may be suitably selected in consideration of the aforementioned conditions. For example, the amount of the ruthenium component with respect to the weight of the carrier is typically 0.05–5% by weight, preferably 0.05–2% by weight, more preferably 0.1–2% by weight, calculated in terms of metallic ruthenium. The amount of the zirconium component is typically 0.05–20% by weight, preferably 0.1–15% by weight, more preferably 1.0–15% by weight, calculated in terms of zirconium oxide. The amount of the magnesium component is typically 0.5–20% by weight, preferably 0.5–15% by weight, calculated in terms of magnesium oxide. When the amount of the magnesium component is less than 0.5% by weight, the catalytic activity may be low.

The molar ratio of the magnesium component to the zirconium component contained in a catalyst, Mg/Zr, is typically 0.1–10, preferably 0.5–5, and more preferably 1–2, wherein the ratio Mg/Zr represents the molar ratio of magnesium atoms (Mg) to zirconium atoms (Zr). When the molar ratio Mg/Zr is less than 0.1, the incorporated components' effect of suppressing a decrease of the surface area is not fully exerted, and the effect of increasing the heat resistance may become insufficient. On the other hand, even when the molar ratio is in excess of 10, improvement of heat resistance may not be commensurate.

In the present invention, in order to further enhance the activity of the catalyst, a cobalt component as described below is preferably incorporated.

(3) Four-component System (Ruthenium, Zirconium, Alkaline Earth Metal or Rare Earth Metal, and Cobalt)

The amount of the cobalt component, which is an optional component in the present invention, is typically such that the molar ratio (Co/Ru) of cobalt (Co) to ruthenium (Ru) is 0.01–30, preferably 0.1–30, more preferably 0.1–10. When the molar ratio is less than 0.01, the cobalt content decreases, and as a result, the expected effect of enhancing the activity may not be attained. On the other hand, when the molar ratio is in excess of 30, the relative ruthenium content decreases. In this case, it is difficult to maintain the high activity of a ruthenium-containing steam reforming catalyst applicable to hydrocarbons. Moreover, the effect of inhibiting precipitation of carbon may be impeded even under operation conditions of a low steam/carbon ratio.

III. Specific Surface Area of a Catalyst

In the present invention, a catalyst having a remarkably increased specific surface area can be obtained by impregnating a porous α-alumina material with specific metal components. This is because the respective metal components are present as very fine grains, and yet they do not clog micropores of the porous α-alumina material.

Moreover, the catalyst of the present invention exhibits not only high catalytic activity but also high mechanical strength and heat resistance, which are characteristics of α-alumina.

The specific surface area of the catalyst of the present invention is typically 7–50 $m^2/g$, preferably 8–20 $m^2/g$, more preferably 8–15 $m^2/g$. Specific surfaces areas of less than 7 $m^2/g$ cannot provide satisfactory catalytic activity, because the metal components cannot be dispersed extensively on and within the carrier. On the other hand, specific surface areas in excess of 50 $m^2/g$ exhibit too small a micropore size, thus hindering diffusion of raw materials into the micropores. In this case, the increased specific surface area may provide no effect.

The ratio $S_1/S_2$ of the specific surface area of the catalyst of the present invention ($S_1$) to the specific surface area of a porous α-alumina material serving as a carrier ($S_2$) is preferably 3 or more, more preferably 5–50, particularly preferably 10–30. When the ratio is less than 3, a catalyst having a specific surface area sufficient for exhibiting satisfactory catalytic activity may not be obtained.

IV. Peak in the Micropore Distribution Profile of a Catalyst

The catalyst of the present invention has micropores. The distribution profile of the catalyst is such that at least one peak falls within the range of 5–1000 angstroms, preferably 10–100 angstroms. The micropores are formed by the components carried on the porous alumina material. The distribution of micropores is computed by use of the adsorption amount of nitrogen calculated from absorption-desorption characteristics of nitrogen under different pressures. The absence of a peak in a range of less than 1000 angstroms in the micropore diameter distribution indicates that satisfactory micropores have not been formed: the specific surface area is insufficient, so active components are not sufficiently distributed on the carrier, resulting in a decreased reaction activity. However, when there is a peak within a range of less than 5 angstroms, the micropores are excessively small and impede the entrance of the reactive substance into the micropores, resulting in lack of the effect of improving activity.

V. Incorporation of Metal Components into a Porous α-alumina Material

1. Method of Incorporation

In the present invention, the method of incorporating a metal component into a porous α-alumina material is not particularly limited. For example, the aforementioned porous α-alumina material may be impregnated with a solution containing at least one or more ruthenium compounds and optionally containing one or more zirconium compounds, one or more compounds selected from alkaline earth metal compounds and rare earth metal compounds (e.g., one or more magnesium compounds), and further optionally, one or more cobalt compounds. In such a method, a ruthenium component and optional components such as a zirconium component, alkali earth metal component, a rare earth metal component, and a cobalt component can be deposited uniformly on the surface of the porous α-alumina material or incorporated into the micropores of the porous α-alumina material, with excellent distribution. Moreover, even when typical pretreatment such as firing at high temperature and reduction is performed, the ruthenium component and zirconium oxide retain a well-dispersed state, easily providing a ruthenium-bearing catalyst of high performance.

(1) Solution

The pH of a solution containing the metal compounds employed in the above incorporation method is preferably adjusted to 3 or less, more preferably 1.5 or less, through addition of an acid, etc. If the pH of the solution is in excess of 3, one or more the compounds contained in the solution tend to precipitate or coagulate to form a gel, and as a result, the metal component(s) cannot be retained on the carrier in a well-dispersed state. By contrast, when the pH is 3 or less, it is speculated that the ruthenium compound reacts with the zirconium compound, etc. to form a complex-like compound, which is also incorporated as formed, so as to provide a catalyst having further improved catalytic activity.

Moreover, a catalyst containing additives in the form of an alkaline earth metal or rare earth metal component in addition to the ruthenium component and the zirconium component has a specific surface area which is remarkably stable to heat. This heat stability is maintained during post-firing reactions or reactions at high temperature. Thus, the catalyst exhibits long-term heat resistance.

(2) Solvent

No particular limitation is imposed on the solvent used in the above solution, and there may be used any solvent that can dissolve at least a ruthenium compound and the optional compounds, i.e., a zirconium compound, an alkaline earth metal component or a rare earth metal component, and a cobalt compound. Examples of the solvent include water, a water-based solvent, and an organic solvent such as alcohol and ether. Of these, water or a water-based solvent is preferred in view of the above compounds' high solubility therein.

(3) Raw Materials of Metal Components

The type and shape of the compounds which serve as the starting materials of metal components are not particularly limited so long as the compounds can dissolve in the above-mentioned solvents. Examples of the starting compounds are as follows.

(3-1) Ruthenium Compounds

Examples of ruthenium compounds which may be used in the present invention include ruthenium halides such as ruthenium trichloride; haloruthenate salts such as potassium hexachlororuthenate; ruthenate salts such as potassium tetraoxoruthenate; ruthenium tetraoxide; ammine complex salts such as hexaammineruthenium trichloride; and cyano complex salts such as potassium hexacyanoruthenate. Moreover, a compound having low solubility in a solvent per se may also be used as a raw material in the present invention so long as it becomes soluble by the addition of or in the co-presence of an acid or an acidic compound. For example, although ruthenium oxides (such as diruthenium trioxide), ruthenium hydroxides, and ruthenium oxyhalides, etc. are insoluble or slightly soluble in water at a pH of approximately 7, they can be used in the present invention, because they become soluble with the addition of acid such as hydrochloric acid. These ruthenium compounds may be used singly or in combination of two or more species.

Of these raw ruthenium compounds, ruthenium trichloride is particularly preferred in that it is widely used in industry and is easily available.

(3-2) Zirconium Compounds

Examples of zirconium compounds which may be used in the present invention include halides such as zirconium tetrachloride or partially hydrolyzed products of halides; oxyhalides such as zirconyl chloride (zirconium oxychloride); oxyacid salts such as zirconyl sulfate, zirconium nitrate, and zirconyl nitrate; zirconate salts such as potassium tetraoxozirconate and sodium hexafluorozirconate; organic acid salts or organic coordination compounds such as zirconium acetate, zirconyl acetate, zirconyl oxalate, and potassium tetraoxalatozirconate; zirconium alkoxides; zirconium hydroxides; and zirconium complex salts. These compounds include, in addition to compounds soluble in a solvent under normal conditions (i.e., in the absence of acid), compounds soluble in an acidic solvent containing an acid such as hydrochloric acid or an acidic compound.

Of these zirconium compounds, zirconium oxychlorides are particularly preferred. Examples of the oxychlorides include hydrates represented by $ZrOCl_2.nH_2O$ or $ZrO(OH)Cl.nH_2O$ and commercially available water-based solutions. Zirconium oxychloride is considered to form a certain complex-like compound with ruthenium. These zirconium compounds may be used singly or in combination of two or more species.

(3-3) Alkaline Earth Metal Compounds and Rare Earth Metal Compounds

The alkaline earth metal compounds and rare earth metal compounds which may be used in the present invention include nitrates, chlorides, acetates, and oxalates of alkaline earth metals and rare earth metals; as well as alkoxide compounds of these metals. Examples thereof include nitrates such as magnesium nitrate, calcium nitrate, strontium nitrate, lanthanum nitrate, and cerium nitrate; chlorides such as magnesium chloride, calcium chloride, strontium chloride, lanthanum chloride, and cerium chloride; acetates such as magnesium acetate and calcium acetate; oxalate such as magnesium oxalate, calcium oxalate, and strontium oxalate; and alkoxide compounds such as magnesium methoxide, magnesium ethoxide, calcium methoxide, and calcium ethoxide. These compounds include those which become soluble in a solvent through addition of acid such as hydrochloric acid, an acidic compound, or an alcohol such as methanol. Of these, nitrates and chlorides are preferred in consideration of their high solubility. These compounds may be used singly or in combination of two or more species.

(3-4) Cobalt Compounds

The cobalt compounds which may be used in the present invention include compounds soluble in specific solvents as well as compounds which become soluble after adjustment of the pH of the solvent through addition of acid such as hydrochloric acid or an acidic compound. Examples thereof include cobaltous nitrate, basic cobaltous nitrate, cobalt dichloride, and hydrates thereof. Of these, cobalt nitrates and chlorides are preferred in view of their high solubility, with cobaltous nitrate being particularly preferred. These cobalt compounds may be used singly or in combination of two or more species.

(4) Preparation of Solutions (4-1) Steps for Preparing Solutions

When the above-mentioned solutions are prepared, there is no particular limitation regarding the order and manner of adding, mixing, or dissolving respective components including solvents, ruthenium compounds, zirconium compounds, alkaline earth metal compounds or rare earth metal compounds, cobalt compounds, and acids. For example, specific components may be added simultaneously or sequentially to a solvent or an acid-added acidic solution. Alternatively, solutions of respective components which have been prepared independently may be mixed. A solution containing portions of components may be prepared, and subsequently the remaining components may be added thereto. Although the solution preferably measures around room temperature, it may be heated to approximately 80° C. when accelerated dissolution is desired.

Inorganic acids (such as hydrochloric acid, sulfuric acid, and nitric acid) and organic acids (such as acetic acid and oxalic acid) may be used to enhance solubility of raw compounds in a solvent and to adjust the pH of the solution.

(4-2) Amount of Metal Components to be Incorporated

When zirconia which also serves as a catalyst component is used in combination with ruthenium, the ratio of the zirconium compound to the ruthenium compound as represented by the molar ratio (Zr/Ru) of zirconium (Zr) to ruthenium (Ru) is 100 or less, preferably 1–50, more preferably 2–20. When the molar ratio Zr/Ru is less than 1, the dispersion state of the ruthenium component on the carrier may become poor, or the ruthenium component may not be retained in the vicinity of the zirconium component. The reason for this is considered that portions of the ruthenium compound cannot form a complex-like compound. On the other hand, when the molar ratio Zr/Ru is in excess of 100, the dispersion state of the ruthenium component on and within the carrier is no longer improved, and what is worse, the ruthenium component is covered with the zirconia component, to thereby reduce the catalytic activity due to less amounts of the ruthenium component exposed to the carrier surface. In addition, excellent characteristics of porous α-alumina material may be marred.

When an alkaline earth metal compound or a rare earth metal compound is used in combination, the molar ratio represented by M/Zr of an alkaline earth metal or a rare earth metal (M) to zirconium (Zr) is typically 0.01–10, preferably 0.05–5, more preferably 0.1–5. When the molar ratio (M/Zr) is less than 0.01, the addition of the alkaline earth metal compound or a rare earth metal compound does not effect as expected. Namely, specific surface area of the catalyst may decrease and heat resistance of the carrier may not increase when the catalysts is exposed to high temperatures during reaction or firing. On the other hand, even if the molar ratio M/Zr is in excess of 10, improvement of heat resistance may not be commensurate.

In cases in which a cobalt compound is used in combination, the cobalt compound is typically used in a molar ratio (Co/Ru) of cobalt (Co) to ruthenium (Ru) of 0.01–30, preferably 0.1–30, and more preferably 0.1–10. When this molar ratio is less than 0.01 with low cobalt component content, the expected effect of enhancing the activity may not be attained, whereas if the molar ratio is in excess of 30, the relative ruthenium content decreases. In this case, it is difficult to maintain the high activity as a ruthenium-containing steam reforming catalyst for hydrocarbons, and in addition, the effect to suppress precipitation of carbon may be lost under the operation conditions of low steam/carbon ratio.

(4-3) Concentration of Each Component

No particular limitation is imposed on the quantity (concentration) of each compound to be dissolved in the aforementioned solution. The concentration of a ruthenium compound is typically selected to be 0.001 mol/l or more, preferably 0.01–1 mol/l, and more preferably 0.1–0.5 mol/l in terms of the molar concentration of ruthenium.

The above solution may contain, in addition to an essential ruthenium compound, zirconium compounds, alkaline earth metal or rare earth metal compounds, cobalt compounds, solubility-adjusting components, and other components as needed, so long as the effect of the present invention is not impeded.

(4-4) Homogeneous Dissolution In order to dissolve each compound homogeneously in a solvent, the pH of the solution is adjusted to 3 or less, preferably to 1.5 or less. If the pH is in excess of 3, zirconium compounds easily hydrolyze to form hydroxide-like sol or gel. The resultant sol or gel is considered to have difficulty in forming the aforementioned complex-like compound with a ruthenium component, and therefore, the addition of a zirconium component may not result in enhanced dispersibility of a ruthenium component.

2. Impregnation (1) Types of Methods

Each metal component may be supported on a porous α-alumina material through a conventional impregnation method by use of a solution prepared in the aforementioned manner. Examples of the process include a variety of impregnation methods (heat-impregnation, normal temperature impregnation, vacuum impregnation, atmospheric pressure impregnation, impregnation-drying process, pore-filling process, arbitrary combinations thereof, etc.), an immersion method, a light wetting method, a wet-adsorption method, a spray method, a coating method, and combined methods thereof. Any method may be employed so long as it brings a solution and a porous α-alumina material into contact so as to carry the metal component(s) on the α-alumina material. Although a sequential operation of impregnation, drying, and firing is required at least once in the present invention, each step may optionally be repeated several times.

(2) Quantity Ratio of a Porous α-alumina Material to an Impregnation Solution

The ratio of an alumina carrier to an impregnation solution may be determined in accordance with the target amount of the active metal components to be carried, concentrations of metal compounds in an aqueous solution to be used, the type of impregnation method, and micropore volume and specific surface area of the porous α-alumina material to be used.

(3) Operation Conditions

No particular limitation is imposed on the conditions of impregnation procedure. Typically, impregnation procedure is performed at a temperature ranging from ambient temperature to approximately 80° C., preferably at room temperature or at a temperature close to room temperature, and under atmospheric pressure or reduced pressure (with evacuation).

(4) Drying After Impregnation

A porous α-alumina material impregnated with the aforementioned metal components is subsequently dried. No particular limitation is imposed on the drying conditions. Drying is typically performed at 50–150° C. for one hour or more, preferably at 100–120° C. for 12 hours or more. In the case of air-drying, it is performed for about a whole day and night (24 hours). Depending on the type of the impregnation method used, substantial amounts of moisture may evaporate, and a porous alumina material that is already dried considerably is obtainable. In such a case, a separate drying step need not be performed.

(5) Firing After Drying

The porous α-alumina material dried as described above is thereafter fired to provide a catalyst. Firing is performed typically in air or air-flow for about 1–24 hours at 400–800° C., preferably at 450–800° C., more preferably at 450–600° C. In a firing atmosphere, an oxygen-containing gas such as pure oxygen and oxygen-enriched air may be used totally or partially.

A catalyst product which is obtained through firing carries thereon a ruthenium component, and optionally, a zirconium component, alkaline earth metal compound or rare earth metal compound, and cobalt component, and these components are typically carried in the form of oxides or complex oxides. The components neighbor to one another and are supported by the porous α-alumina material in a highly dispersed state.

(6) Pretreatment

The thus-obtained catalyst may directly be used as a catalyst or a component in a specific catalytic reaction, or may be activated by suitable processes of pretreatment for subsequent use in a catalytic reaction. The pretreatment may be performed by use of a customary method. For example, a ruthenium component may be reduced with a reducing agent such as hydrogen to be converted into highly dispersed metallic ruthenium for use in a reaction.

The reduction process by use of hydrogen is typically performed at 500–850° C. until hydrogen consumption is not observed.

VI. Steam Reforming Reaction of Hydrocarbons and Oxygen-containing Compounds

A steam reforming reaction of a hydrocarbon and an oxygen-containing compound in the presence of a ruthenium-on alumina catalyst of the present invention will next be described.

1. Starting Materials (Hydrocarbon, Oxygen-containing Compound, and Water)

(1) Hydrocarbon and Oxygen-containing Compound

Hydrocarbons and oxygen-containing compounds which are used in the reaction are not particularly limited. Examples of hydrocarbons include approximately C1–16 linear or branched saturated aliphatic hydrocarbons such as methane, ethane, propane, butane, pentane, hexane, heptane, octane, nonane, and decane; alicyclic saturated hydrocarbons such as cyclohexane, methylcyclohexane, and cyclooctane; and monocyclic or polycyclic aromatic hydrocarbons. Examples of oxygen-containing compounds (hereinafter occasionally referred to as hydrocarbons) include alcohols such as methanol and ethanol and ethers such as dimethyl ether and diethyl ether. In addition, city gas having a boiling point range of 300° C. or less, LPG, naphtha, methanol for kerosene industry, and $CO_2$-dissolved dimethyl ether for $NO_x$ reduction in combustion, etc. may be used as preferable starting materials. A mixture of two or more of these hydrocarbons may also be used as a starting material. If these hydrocarbons contain sulfur, they are preferably desulfurized before use to render the sulfur content about 1 ppm or less. A sulfur content of more than about 1 ppm may cause deactivation of catalyst. Methods of desulfurization are not particularly limited, and examples thereof include hydrogenation and adsorption.

(2) Water Content

No particular limitation is imposed on the nature of water which is caused to react with hydrocarbons. Water may be mixed with hydrocarbons in advance.

2. Reformation Reaction (1) Steam/Carbon Ratio

A steam/carbon ratio in reformation reactions of hydrocarbons is typically 1.5–10, preferably 1.5–5, more preferably 2–4. When an oxygen-containing compound is used, steam can be saved on account of oxygen originating from the compound. A hydrogen-rich gas is produced by regulating the steam/carbon ratio to fall within the above ranges. In steam reformation using a catalyst of the present invention, carbon deposition is prevented even when the steam/carbon ratio is regulated to 3 or less. Therefore, waste heat is utilized effectively.

(2) Reaction Conditions (2-1) Reaction Temperature

Reaction temperature is typically 100–900° C., preferably 150–850° C., more preferably 200–800° C. Raction temperature can not necessarily be predetermined, because it depends on a variety of factors such as starting materials which are used in the reaction.

2. Reaction Pressure

Reaction pressure is typically 0–30 $kg/cm^2G$, preferably 0–10 $kg/cm^2G$.

(3) Reaction Method (3-1) Reaction Process

Either a continuous flow processor a batch process may be used, with the former process being preferred.

In the case of a continuous flow process, a gas hourly space velocity (GHSV) of a mixture gas of hydrocarbons and steam is typically 1,000–100,000 $h^{-1}$, preferably 2,000–50,000 $h^{-1}$, more preferably 2,000–40,000 $h^{-1}$.

(3-2) Reaction Type

No particular limitation is imposed on the type of reaction or the reactor. Examples of reaction types include an immobilized bed process, a mobilized bed process, and a fluidized bed process. A tube-like reactor may be used as the reactor.

3. Reaction Product

Mixtures containing hydrogen, methane, carbon monoxide, etc. are obtained from a reaction of hydrocarbons and water in the presence of a catalyst of the present invention under the aforementioned conditions. Since these mixtures normally contain 50 vol. % or more of hydrogen, a reformation process according to the present invention can be suitably used in the manufacture of hydrogen for fuel cells.

The present invention will next be described in detail by way of examples.

EXAMPLE 1

α-Alumina powder having a grain size of 3–5 μm and water (in the amount of 20% by weight of the powder) were mixed by a kneader to provide a mixture, which was compression-molded at 150 $kgf/cm^2$ with a molding apparatus to provide a columnar (diameter 5 mm, height 5 mm) molded product. The molded product was dried by residual heat of a firing gas furnace and was subsequently fired in a gas furnace at 1,280° C. for 26 hours to provide a porous material. This material was used as a catalyst carrier. The crushing strength of the porous material as measured by a Kiya's crushing strength measuring apparatus was at least 50 kgf. In X-ray diffraction analysis, the ratio ($I_B/I_A$) of the most intensive peak strength attributed to a compound other than α-alumina ($I_B$) to the most intensive peak strength attributed to α-alumina ($I_A$) was 0.001. Micropore volume and average micropore size as measured by the below-described method were 0.26 cc/g and 1.6 μm, respectively.

An impregnation solution was prepared by the following procedure. Ruthenium trichloride ($RuCl_3 \cdot nH_2O$: Ru content 38%, 0.66 g), magnesium nitrate ($Mg(NO_3)_2 \cdot 6H_2O$, 6.36 g), and cobalt nitrate ($Co(NO_3) \cdot 6H_2O$, 2.47 g) were dissolved in a zirconium oxychloride ($ZrO(OH)Cl$) aqueous solution (ZC-2: product of Dai-ichi Rare Element Industry Co.) to provide a solution having a total volume of 10 cc. After being stirred for at least 1 hour, the solution was used for impregnation. The impregnation solution had a red-orange color and pH of 0.5 or less. The impregnation solution was impregnated into 50 g of the aforementioned porous α-alumina material by a pore-filling method.

The color of the as-impregnated carrier was orange, whereas it turned to green after 5 hours' drying at 120° C. Finally, the impregnated carrier was fired at 500° C. for 2 hours in air to provide a catalyst. A compositional analysis revealed that the proportions of the metal components of the obtained catalyst were as follows: $ZrO_2$ 5.0% by weight, MgO 2.0% by weight, Ru 0.5% by weight, and Co 1.0% by weight.

Physical properties of the porous α-alumina material and the catalyst were measured by the following method.

Micropore volume and an average micropore size were measured with the following micropore distribution measurement apparatus (mercury porosimeter) which uses the mercury penetration method under the following conditions.

Apparatus: Micromeritics: Autopore 9220

Conditions: A catalyst was dried for at least 1 hour, followed by penetration of mercury into the catalyst at an elevated pressure of 50,000 psia according to the operation instructions of the apparatus. A micropore size (median diameter) at the maximum micropore volume derived from total micropore volume and micropore distribution was measured as an average micropore size. The measurement results are summarized in Table 1.

Micropore distribution and BET specific surface area of a catalyst were measured by the following apparatus under the following conditions.

Apparatus: OMNISORP 360 manufactured by Omnitron Technology Co.

Conditions: A catalyst was crushed to classify as 16–32 mesh. A classified catalyst (5 g) was placed in a sample vessel, and the vessel was set in the apparatus. The sample was evacuated to 0.1 Torr or less and heated at 300° C. for 3 h, followed by nitrogen adsorption to 150 Torr. Micropore distribution and BET specific surface area were calculated from adsorption quantity of nitrogen on the catalyst obtained by the desorption process. By this method, a micropore distribution profile in the range of 2.5–2000 Å, as well as related specific surface areas can be calculated. The measurement results are summarized in Table 1.

Reaction activity of the catalyst to steam reformation of propane was measured by the following method.

A catalyst (1 cc) was charged into a quartz reactor tube (inside diameter 20 mm), followed by reduction with hydrogen stream (GHSV of hydrogen gas: 6,000 h$^{-1}$) at 500° C. for 2 hours. Propane and steam were introduced for steam reformation under the conditions: reaction temperature 450° C. and 550° C., GHSV of propane 6,000 h$^{-1}$, and steam/carbon ratio (S/C)=3.0. The formed gases were sampled for gas chromatographic analysis. The results of analysis were used to calculate conversion of propane in accordance with the following equation. The results of calculation are shown in Table 2.

$$100 - \frac{(C_3H_8) \times 3}{CO + CO_2 + CH_4 + (C_2H_4 + C_2H_6) \times 2 + (C_3H_6 + C_3H_8) \times 3} \times 100\,(\%)$$

EXAMPLES 2 THROUGH 14

A porous columnar α-alumina material was prepared in a similar manner except that α-alumina powder having a grain size of 3–5 μm (90% by weight) and bentonite (grain size 0.5–30 μm, 10% by weight) were mixed with water (in the amount of 20% by weight of the powder) in a kneader. The crushing strength of the porous material was at least 50 kgf. In X-ray diffraction analysis, the ratio ($I_B/I_A$) of the most intensive peak strength attributed to a compound other than α-alumina ($I_B$) to the most intensive peak strength attributed to α-alumina ($I_A$) was 0.005. Micropore volume and an average micropore size were 0.20 cc/g and 2.2 μm, respectively.

Catalysts of Examples 2 through 14 were prepared from the same starting compounds so that predetermined amounts of respective elements are carried by the α-alumina materials.

Amounts of the metal elements as obtained from a composition analysis of the obtained catalysts are shown in Table 1.

Physical properties and activities of the porous α-alumina materials and catalysts were determined in a manner similar to that employed in Example 1. Steam reformation of propane was also evaluated as described in Example 1. Catalytic activity at reaction temperatures of 400° C. and 500° C. were also evaluated in Examples 3 through 14. The results of the evaluation of the reactions is described in Table 2.

TABLE 1

| | Content of catalyst component (wt. %) | | | | Specific surface area (m$^2$/g) | | Specific surface area ratio | Micropore peak |
|---|---|---|---|---|---|---|---|---|
| | | | | | carrier | catalyst | | |
| | Ru | Co | ZrO | MgO | ($S_2$) | ($S_1$) | ($S_1/S_2$) | (Å) |
| Example 1 | 0.5 | 1.0 | 5.0 | 2.0 | 0.8 | 13.5 | 16.9 | 35 |
| Example 2 | 0.5 | 1.0 | 5.0 | 2.0 | 0.4 | 10.4 | 26.0 | 35 |
| Example 3 | 0.5 | 0 | 5.0 | 2.0 | 0.4 | 8.2 | 20.5 | 38 |
| Example 4 | 0.5 | 0.06 | 5.0 | 2.0 | 0.4 | 8.5 | 21.3 | 38 |
| Example 5 | 0.5 | 0.15 | 5.0 | 2.0 | 0.4 | 9.1 | 22.8 | 36 |
| Example 6 | 0.5 | 0.29 | 5.0 | 2.0 | 0.4 | 9.8 | 24.5 | 34 |
| Example 7 | 0.5 | 0.58 | 5.0 | 2.0 | 0.4 | 9.2 | 23.0 | 36 |
| Example 8 | 0.5 | 1.00 | 5.0 | 2.0 | 0.4 | 8.6 | 21.5 | 38 |
| Example 9 | 0.5 | 0.15 | 6.1 | 0.2 | 0.4 | 8.1 | 20.3 | 38 |
| Example 10 | 0.5 | 0.15 | 6.1 | 3.0 | 0.4 | 8.8 | 22.0 | 36 |
| Example 11 | 0.5 | 0.15 | 6.1 | 1.0 | 0.4 | 8.2 | 20.5 | 38 |
| Example 12 | 0.5 | 0.15 | 6.1 | 0.5 | 0.4 | 8.2 | 20.5 | 38 |
| Example 13 | 0.5 | 0.15 | 6.1 | 2.0 | 0.4 | 8.6 | 21.5 | 36 |
| Example 14 | 0.5 | 0.15 | 6.1 | 0.0 | 0.4 | 8.1 | 20.3 | 38 |

Note:
Ru; ruthenium,
Co; cobalt,
ZrO; zirconia,
MgO; magnesia

TABLE 2

| | Conversion of propane (%) | | | |
|---|---|---|---|---|
| | 400° C. | 450° C. | 500° C. | 550° C. |
| Example 1 | — | 25 | — | 94 |
| Example 2 | — | 21 | — | 92 |
| Example 3 | 2.0 | 12 | 58 | 84 |
| Example 4 | 2.4 | 11 | 41 | 85 |
| Example 5 | 4.4 | 22 | 88 | 93 |
| Example 6 | 5.7 | 28 | 94 | 94 |
| Example 7 | 4.6 | 23 | 93 | 91 |
| Example 8 | 2.7 | 12 | 43 | 82 |
| Example 9 | 0.8 | 1 | 8 | 7 |
| Example 10 | 4.5 | 23 | 92 | 91 |
| Example 11 | 0.9 | 4 | 14 | 52 |
| Example 12 | 0.3 | 1 | 3 | 10 |
| Example 13 | 3.2 | 14 | 50 | 68 |
| Example 14 | 1.4 | 4 | 10 | 19 |

As is apparent from Tables 1 and 2, the catalyst of Example 1 and that of Example 2 both having a large specific surface area and a micropore size of less than 1000 Å exhibited high propane conversion and catalytic activity.

As described above, the ruthenium-on-alumina catalyst of the present invention having a specified porous α-alumina material as a catalyst carrier exhibits excellent crushing strength. Accordingly, the catalyst of the present invention is not crushed in a reformation reactor, and prevents a catalyst layer and piping from clogging. The catalyst of the present invention has an enlarged specific surface area of 7–50 m$^2$/g, which facilitates effective supporting of metal components. In a catalyst of the present invention, a ruthenium component and an optional cobalt component and magnesium component are supported in the vicinity of a zirconium component, in a highly dispersed state and with good heat stability. When used in steam reformation of a hydrocarbon, it exhibits high catalytic activity per contained ruthenium component and excellent heat resistance. The high catalytic activity may be satisfactorily maintained under high temperatures. The catalyst of the present invention is particularly suitable, in terms of both costs and catalytic activity, for steam reformation in the manufacture of hydrogen for fuel cells. Thus, the catalyst has great value in industry.

What is claimed is:

1. A ruthenium-on-alumina catalyst, comprising: a ruthenium component carried by a porous α-alumina material, which catalyst has a specific surface area (S$_1$) of 7–50 m$^2$/g, and a ratio (S$_1$/S$_2$) of the specific surface area of the ruthenium-on-alumina catalyst (S$_1$) to the surface area of the porous α-alumina material (S$_2$) of 3–50, the catalyst being useful in steam reforming reactions of hydrocarbon and oxygen-containing compounds.

2. The ruthenium-on-alumina catalyst according to claim 1, wherein the catalyst has a specific surface area (S$_1$) of 8–20 m$^2$/g, the catalyst being useful in steam reforming reactions of hydrocarbon and oxygen-containing compounds.

3. The ruthenium-on-alumina catalyst according to claim 1, wherein the porous α-alumina material is impregnated with a ruthenium component and a zirconium component, and the respective amounts are such that the ruthenium component accounts for 0.05–5% by weight as reduced to elemental ruthenium and the zirconium component accounts for 0.05–20% by weight as reduced to zirconium oxide, with respect to the weight of the porous α-alumina material, the catalyst being useful in steam reforming reactions of hydrocarbon and oxygen-containing compounds.

4. The ruthenium-on-alumina catalyst according to claim 1, wherein the porous α-alumina material is impregnated with a ruthenium component, a zirconium component, and an alkaline earth metal or rare earth metal component, and the respective amounts are such that the ruthenium component accounts for 0.05–5% by weight as reduced to elemental ruthenium, the zirconium component accounts for 0.05–20% by weight as reduced to zirconium oxide, and the alkaline earth metal or rare earth metal component accounts for 0.5–20% by weight as reduced to its corresponding oxide, wherein all percentages are with respect to the weight of the porous α-alumina material, the catalyst being useful in steam reforming reactions of hydrocarbon and oxygen-containing compounds.

5. The ruthenium-on-alumina catalyst according to claim 1, wherein the porous α-alumina material is impregnated with a ruthenium component, a zirconium component, an alkaline earth metal or rare earth metal component, and a cobalt component, and the respective amounts are such that the ruthenium component accounts for 0.05–5% by weight as reduced to elemental ruthenium, the zirconium component accounts for 0.05–20% by weight as reduced to zirconium oxide, the alkaline earth metal or rare earth metal component accounts for 0.5–20% by weight as reduced to its corresponding oxide, wherein all percentages are with respect to the weight of the porous α-alumina material, and the cobalt component is incorporated at a molar ratio of cobalt (Co) to (Ru), Co/Ru of 0.01–30, the catalyst being useful in steam reforming reactions of hydrocarbon and oxygen-containing compounds.

6. The ruthenium-on-alumina catalyst according to claim 1, wherein the alkaline earth metal or rare earth metal component is magnesium, the catalyst being useful in steam reforming reactions of hydrocarbon and oxygen-containing compounds.

7. The ruthenium-on-alumina catalyst according to claim 1, wherein the micropore volume of the porous α-alumina material ranges from 0.05–0.5 cc/g.

8. The ruthenium-on-alumina catalyst according to claim 1, wherein the micropore size of the porous α-alumina material ranges from 0.01–100 µm.

9. The ruthenium-on-alumina catalyst according to claim 1, wherein the crushing strength of the porous α-alumina material ranges from 20–100 kgf.

* * * * *